(12) United States Patent
Mifune et al.

(10) Patent No.: US 7,248,753 B2
(45) Date of Patent: Jul. 24, 2007

(54) IMAGE DISPLAYING APPARATUS AND PROGRAM PRODUCT FOR DISPLAYING IMAGE

(75) Inventors: Eiji Mifune, Hirakata (JP); Yoshihisa Tanaka, Higashiosaka (JP); Shinzo Okajima, Osaka (JP); Shigeki Kimura, Kobe (JP)

(73) Assignee: Kyocera Mita Corporation, Osaka (JP)

( * ) Notice: Subject to any disclaimer, the term of this patent is extended or adjusted under 35 U.S.C. 154(b) by 747 days.

(21) Appl. No.: 10/631,684

(22) Filed: Jul. 31, 2003

(65) Prior Publication Data

US 2005/0025389 A1 Feb. 3, 2005

(51) Int. Cl.
*G06K 9/54* (2006.01)
*G06K 15/00* (2006.01)
*H04N 5/222* (2006.01)

(52) U.S. Cl. .................. 382/305; 358/3.12; 348/333.05

(58) Field of Classification Search ................ 382/305, 382/312, 298, 307; 348/333.05, 333.12; 707/100, 101; 358/1.2, 1.16, 3.11, 3.12, 358/523
See application file for complete search history.

(56) References Cited

U.S. PATENT DOCUMENTS 5,933,548 A * 8/1999 Morisawa .................... 382/305
6,943,834 B1 * 9/2005 Hirai ........................ 348/231.6

* cited by examiner

*Primary Examiner*—Kanjibhai Patel
(74) *Attorney, Agent, or Firm*—Jordan and Hamburg LLP

(57) ABSTRACT

To enable a necessary image data to be easily found out based on image sizes of a plurality of index images displayed in a list format and to enable contents of original images displayed as index images to be easily understood, in the case of generating an index image of an image data having an original image size larger than a standard size, a rate of reduction to the original image is increased so that the entire index image is accommodated in an index image display area while maintaining a relative dimensional relationship with index image sizes of image data having other original image sizes.

8 Claims, 19 Drawing Sheets

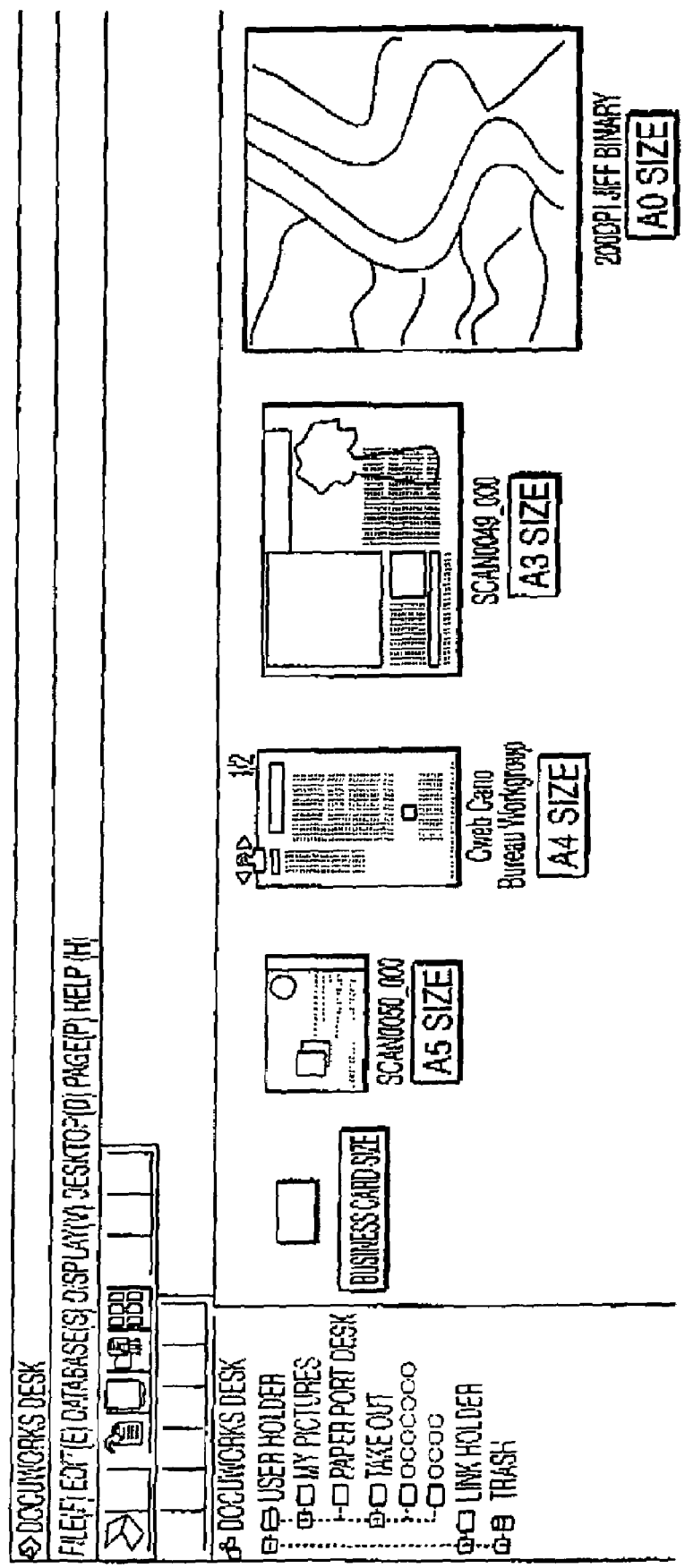

IMAGE DISPLAYING APPARATUS AND PROGRAM PRODUCT FOR DISPLAYING IMAGE

BACKGROUND OF THE INVENTION

This invention relates to an image displaying apparatus for generating index images of a plurality of image data stored in a storage medium and displaying them on a screen of a computer or the like, and an image displaying program product for such an image displaying apparatus.

Conventionally, there have been known an image displaying apparatus for generating index images of a plurality of image data stored in a storage medium such as a hard disk in a computer or an optical disk by reducing the sizes of the respective image data and displaying a list of the generated index images on a screen of the computer, and an image displaying program (the so-called "viewer", etc.) for such an image displaying apparatus.

When a plurality of index images are displayed in a list format, such image displaying apparatus and image displaying program product generate the respective index images of substantially the same size so as to be accommodated within a section (index image display area) D allotted to display one index image regardless of the original image sizes of the respective images (sizes of the images, e.g., sizes of documents read during the image reading by means of a scanner) as shown in FIG. 18. Alternatively, as shown in FIG. 19, the sizes of a plurality of index images to be displayed in a list format are differed depending on the original image sizes, whereby a user can understand the original sizes of the respective images only by seeing the sizes of the respective index images.

However, in the case of displaying the index images in a list format as shown in FIG. 18, the index images are generated to have substantially the same size and displayed in a list format despite the different original image sizes. Thus, the actual sizes of the original images cannot be understood even if the sizes of the respective index images are compared.

Further, in the case of displaying the respective index images while differing the sizes thereof depending on the original image sizes as shown in FIG. 19, a small index image is displayed when the original image size is very small (business card size, etc.) if the size of the index image is decided based on the size frequently used on business such as B5 size or A4 size. Thus, it is difficult for the user to see the content (content of the original image) of the index image. Further, when the original image size is large (A0 size, etc.), the index image cannot be accommodated within the index image display area and, therefore, only a part of the original image can be displayed as an index image. Thus, there are problems that the user cannot understand the content of the entire original image and that the original image size is difficult to understand.

SUMMARY OF THE INVENTION

It is an object of the present invention to provide an image displaying apparatus and an image displaying program product which are free from the problems residing in the prior art.

It is another object of the present invention to provide an image displaying apparatus and an image displaying program product which enable a user to easily find out necessary images based on the image sizes of a plurality of index images displayed in a list format and to easily understand the contents of original images displayed as index images.

According to an aspect of the present invention, an image displaying apparatus is provided with an image data reader for reading image data stored in a storage medium, an index image generator for generating index images of index image sizes corresponding to original image sizes using the read image data. An index image is displayed on a monitor screen.

The index image sizes corresponding to the original image sizes larger than a standard size are stored with larger rates of reduction to the original image sizes in an index image size storage. At least one page of the index image is entirely displayed while maintaining a relative dimensional relationship with the index image sizes corresponding to the other original image sizes.

Alternatively, there may be provided a sample image generator for generating sample images to cause a user to recognize the original image sizes of the image data of the index images through a comparison with the index images.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 19 is a diagram showing a display example of index images by another prior art image displaying apparatus.

DETAILED DESCRIPTION OF THE PREFERRED EMBODIMENTS OF THE INVENTION

Figure 1:
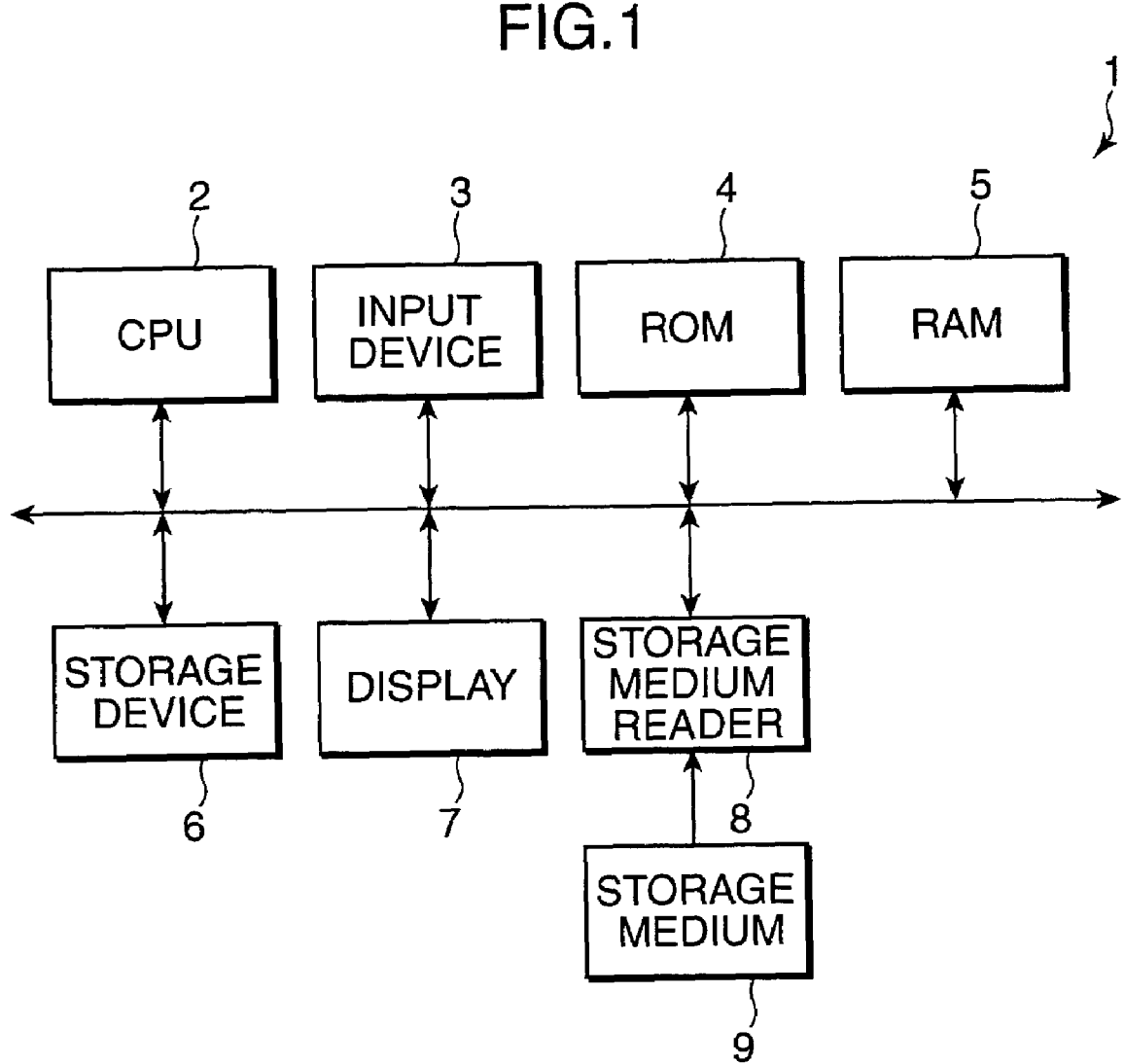
FIG. 1 is a block diagram showing a schematic construction of an image displaying apparatus according to an embodiment of the invention.

An image displaying apparatus and an image displaying program product according to an embodiment of the present invention are described. Referring to FIG. 1, an image displaying apparatus 1 is constituted by a personal computer or the like. The image displaying apparatus 1 is provided with a CPU 2 for controlling the operation of the entire apparatus, and an input device 3, a ROM 4, a RAM 5, a storage device 6, a display 7 and a storage medium reader 8 connected with the CPU 2 via an internal bus. Various data are inputted and outputted between the respective elements via the internal bus under the control of the CPU 2, whereby various operations are carried out.

The input device 3 is formed by a keyboard, a mouse, or the like, and instructions for operations are inputted by a user. A system program for controlling the operation of the entire apparatus and the like are stored in the ROM 4. The storage device 6 is formed by a hard disk drive or the like and an image displaying program is stored therein. In other words, this image displaying program is installed in the personal computer or the like, whereby this personal computer functions as the image displaying apparatus 1.

The CPU 2 reads the image displaying program and the like from the storage device 6 and carries out its processing to control the operations of the respective blocks. The RAM 5 is used as a work area of the CPU 2. The display 7 is constructed by a CRT or a liquid crystal display device to display various screens under the control of the CPU 2.

The image displaying program may be written in the storage device 6 from a storage medium 9 such as a CD-ROM or a FD using the storage medium reader 8 formed by a disk drive or the like. In the case that the image displaying apparatus 1 is connected with another computer or the like via a network, the image displaying program and the like may be downloaded from this computer or the like via the network.

Figure 2:
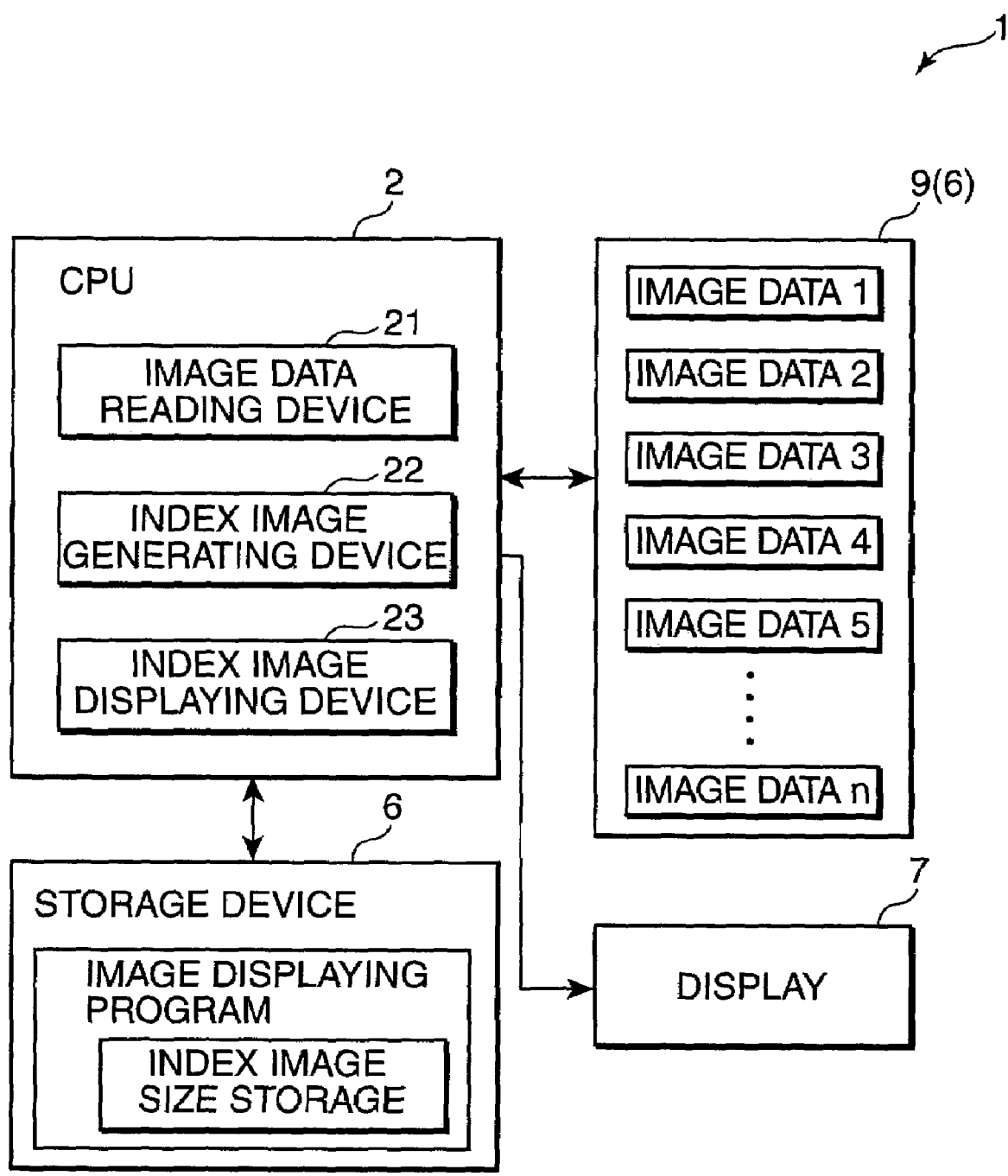
FIG. 2 is a block diagram showing main functions of the image displaying apparatus.
Figure 3:
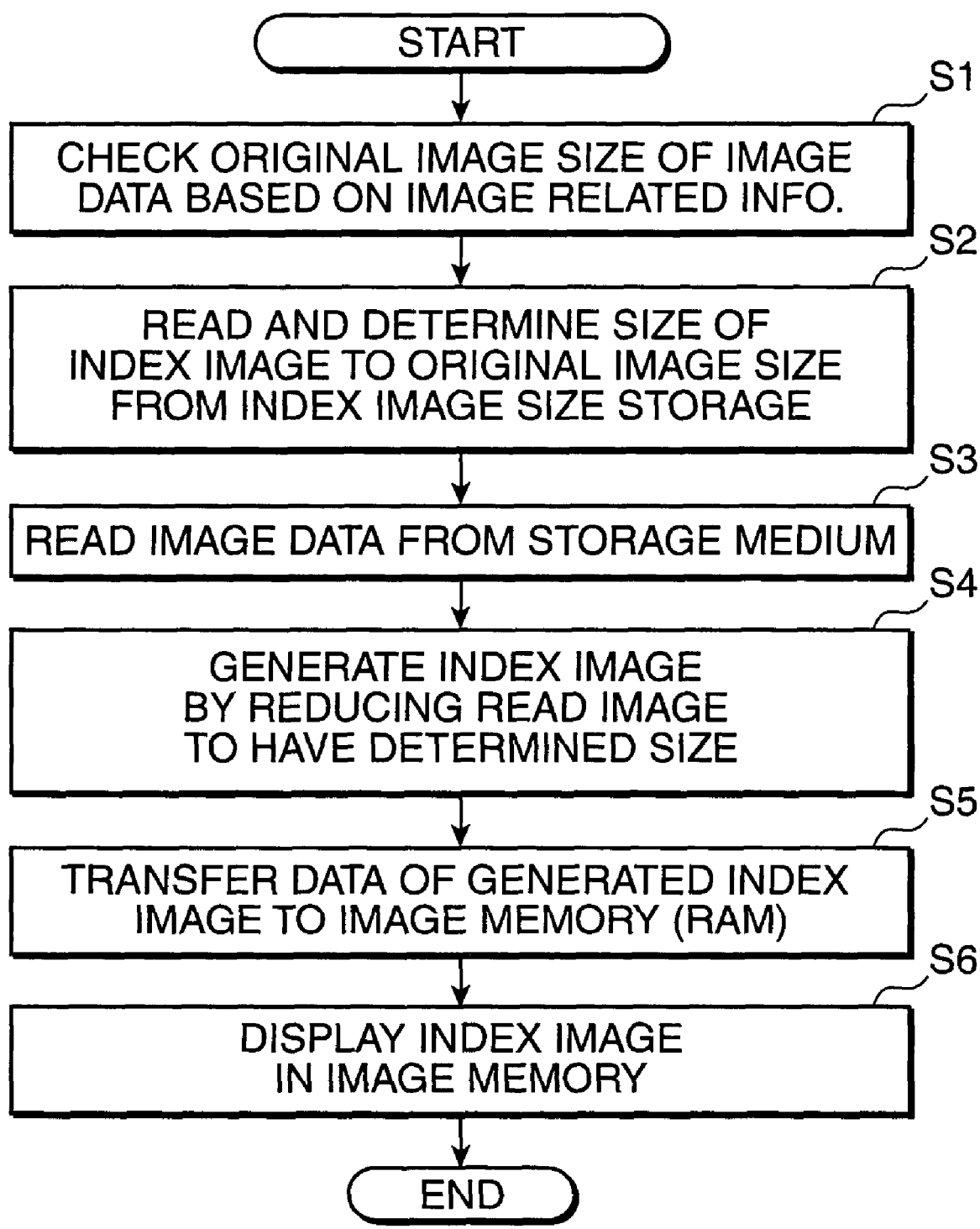
FIG. 3 is a flowchart showing a first index image display processing of the image displaying apparatus.

Next, main functions of the image displaying apparatus 1 thus constructed are described. As shown in FIG. 2, the CPU 2 functions as a program executing device in accordance with the image displaying program stored in the storage device 6 in the image displaying apparatus 1. Image data 1 to n of PDF format or JPEG format stored in the storage medium 9 such as a CD-ROM are read by the CPU 2 via the storage medium reader 8. These image data may be stored in the storage device 6. Index images showing the contents of the image data read from the storage medium 9 are generated by the CPU 2, and the generated index images are temporarily transferred to the RAM 5 which functions also as an image memory (not shown) and displayed on the display 7.

The CPU 2 functions as an image data reading device or image data reader 21 for reading the image data stored in the storage medium 9 in accordance with a command given by the image displaying program stored in the storage device 6; an index image generating device or index image generator 22 for generating index images showing the contents of the image data in reduced sizes; and an index image displaying device 23 for displaying the generated index images on a screen of the display 7 via the RAM 5.

The index image generating device 22 generates index images in the same size as index image sizes stored in the image displaying program from the read image data. These index image sizes are stored in an index image size storage within the image displaying program, and are so set as to differ depending on the original image sizes of the image data (sizes of the images, e.g., sizes of documents read during the image reading by means of a scanner). In other words, the index image size is set to be large if the original image size is large while being set to be small if the original image size is small.

The index image sizes stored in the image size storage differ depending on the original image sizes of the respective image data. A large rate of reduction from the original image size is set for the index image size for the image data having a large original image size such as A0 size, whereas a small rate of reduction from the original image size is set for the index image size for the image data having a small original image size such as business card size.

Next, a first index image display processing is described. In the case of generating the index image using the image data stored in the storage medium 9, the CPU 2 first confirms the original image size of this image data in accordance with an image related information belonging to each image data stored in the storage medium 9 (Step S1), and reads and determines the index image size corresponding to the original image size from the index image size storage within the image displaying program (Step S2).

Figure 4:
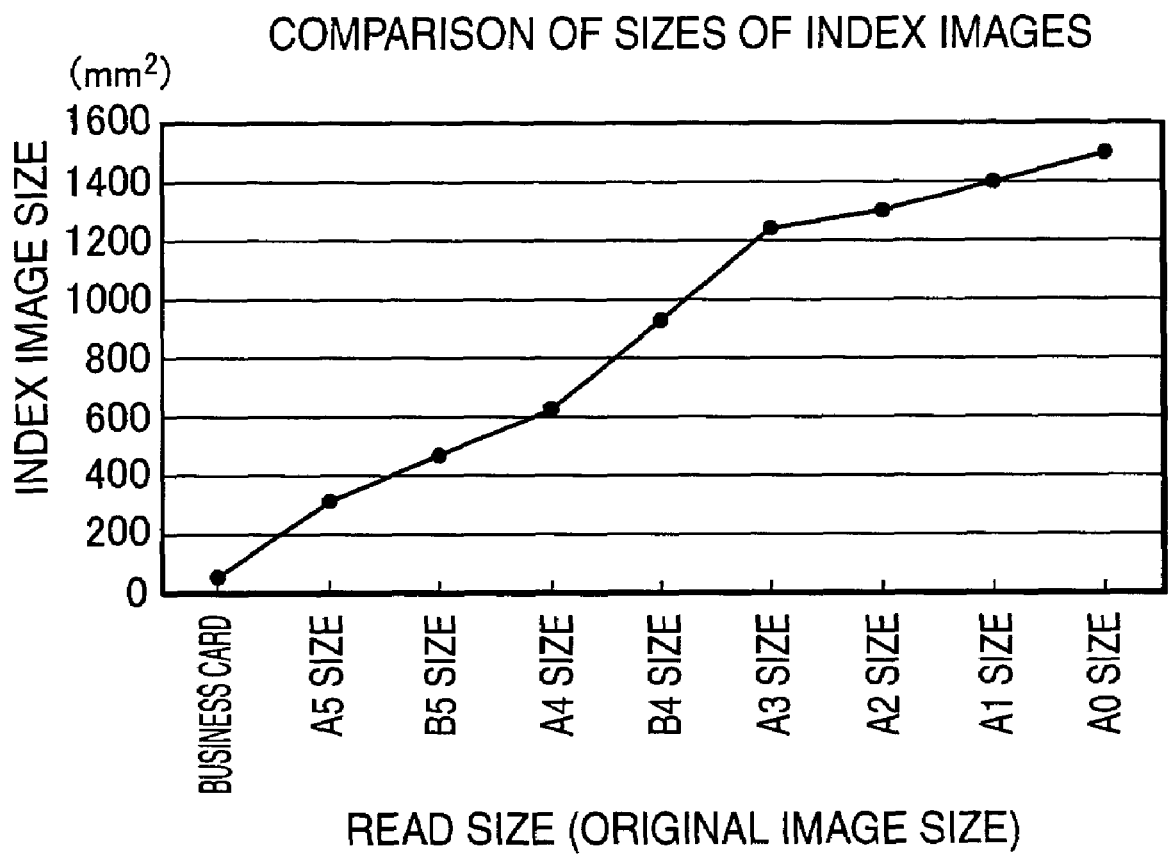
FIG. 4 is a graph showing index image sizes in relation to different image sizes.

The index image sizes differ depending on the original image sizes of the image data. As described above, larger rates of reduction from the original image size are set for the image data having original image sizes (such as an A0 size) larger than standard sizes (A3 size, A4 size and the like frequently used on business, letter size (8.5 inches×11 inches) is used as a standard size in the US), whereas smaller rates of reduction from the original image sizes are set for the image data having original image sizes (such as business card size) smaller than the standard sizes. As shown in the graph of FIG. 4, the index image size is set not to increase perfectly in proportion to the original image size of the image data for the larger original image sizes.

For example, in the case that the original image sizes of the image data are A4 size, B 4 size, and A3 size frequently used as business sheets (letter size (8.5 inches×11 inches) in the US), the index image size increases in proportion as the original image size increases from A4 size to A3 size. For the image data having original image sizes (A2 size or larger) larger than A3 size, larger rates of reduction from the original image sizes are set, so that the sizes of the index images to be generated are close to the index image sizes of the image data of A4 to A3 size. The index image sizes of the image data larger than A3 size are set such that one page of the index image is entirely displayed while maintaining a dimensional relationship of the image sizes of the original image size.

Further, for the image data having sizes smaller than B5 size (smaller than A4 size), smaller rates of reduction from the original image sizes are set, so that the index image sizes are close to those of the image data of A4 to A3 size. The index image sizes in this case are such maximum sizes as to maintain a dimensional relationship of the original image sizes, and are set such that one page of the index images can be entirely displayed.

After the index image size is determined, the image data is read from the storage medium 9 (Step S3), the read image data is reduced by a compression processing to generate the index image of the determined size (Step S4). A data of the generated index image is transferred to the RAM 5 (image memory) (Step S5), and the index image is displayed on the display 7 (Step S6). The above processing is performed for all the image data stored in the storage medium 9.

Figure 5:
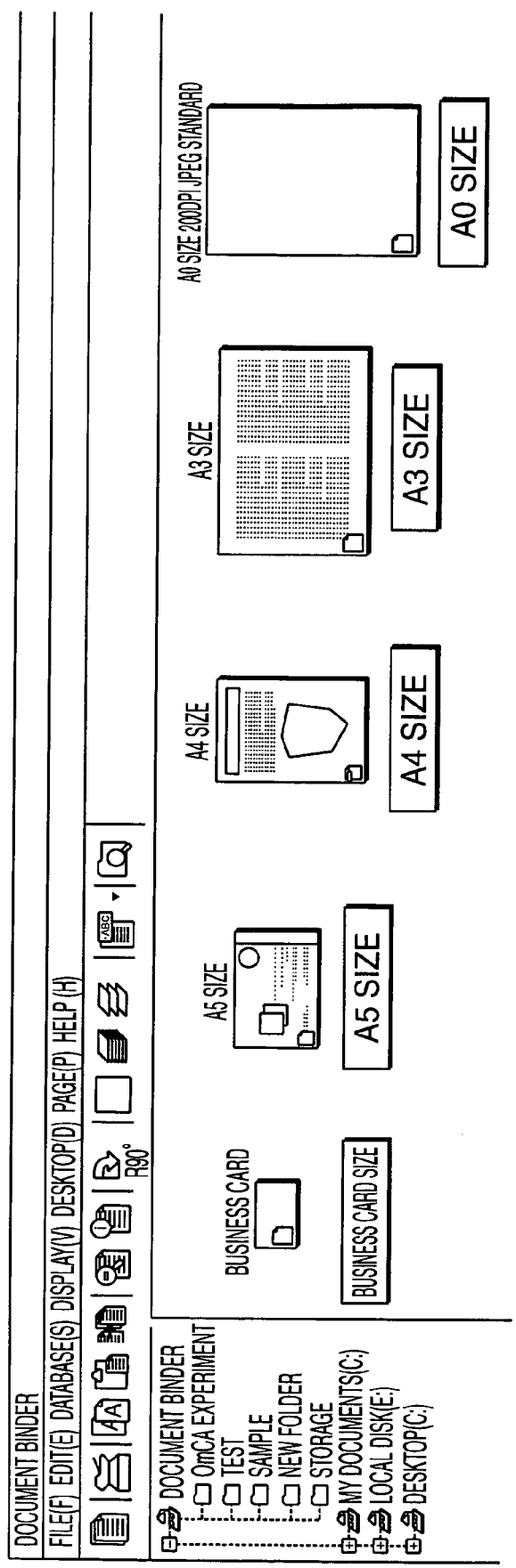
FIG. 5 is a diagram showing a display example of the respective index images on a display.
Figure 6:
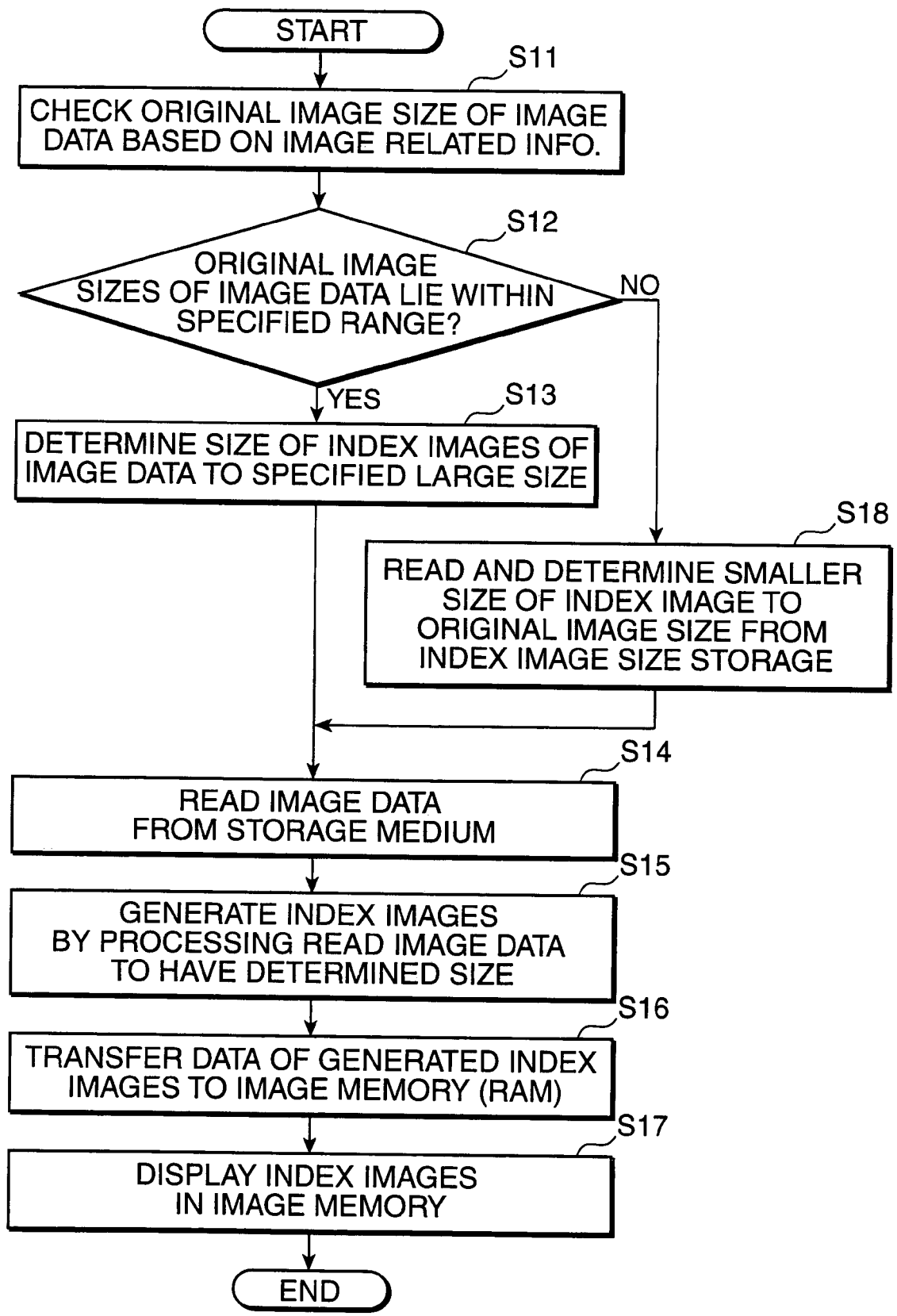
FIG. 6 is a flowchart showing a second index image display processing of the image displaying apparatus.

If the index images are thus generated, the dimensional relationship of the original image sizes of the respective image data is displayed while all the contents of the respective original images are displayed on the screen of the display 7 regardless of the sizes as shown in FIG. 5. Thus, the user can see the respective index images displayed and instantly select the image data of a necessary size by comparing the sizes of the index images displayed. Further, even if the original image size is a large size such as A0 size, all the contents of one page of the image can be displayed. Even if the original image size is a small size such as business card size, the index image is displayed large. Thus, the user can easily understand the contents of the image data regardless of the original image sizes of the image data.

Next, a second index image display processing is described. In the second index image display processing, if the original image size of a plurality of image data stored in the storage medium 9 are compared and determined to lie within a specified range (e.g., if the original image sizes of a plurality of image data are substantially same or if they do not largely vary from business card size to A0 size), the index images are generated while being enlarged to have such a maximum size as to be accommodated within a section (index image display area D) allotted to display one index image while maintaining a relative dimensional relationship with the index images of the image data having other original image sizes.

In the case of performing the second index image display processing, the CPU 2 first confirms the original image sizes of a plurality of image data stored in the storage medium 9 in accordance with an image related information belonging to the respective image data stored in the storage medium 9 (Step S11), and judges whether the original image sizes of the respective image data lie within the specified range (Step S12).

If the original image sizes of the respective image data lie within the specified range (YES in Step S12), the sizes of the index images generated for the respective image data are determined to be a specified large size (Step S13). This specified large size is an index image size maximally enlarged to still accommodate the index image within the index image display area D while maintaining the relative dimensional relationship with the original image sizes of the respective image data. Such enlarged index image sizes are stored in the image size storage within the image displaying program in correspondence with combinations of the original image sizes of the image data for which the index images are to be generated.

Further, unless the original image sizes of the respective image data lie within the specified range (NO in Step S12), e.g., if the original image sizes of the image data in the storage medium 9 largely vary from business card size to A0 size, similar to the first processing, standard sizes predetermined for the image data are read from the index image size storage regardless of the relative dimensional relationship of the image data and determined as the index image sizes (Step S18).

After the index image sizes are determined, the respective image data are read from the storage medium 9 (Step S14), and a compression processing is applied to the read image data to generate the index image of the determined sizes (Step S15). Then, data of the generated index image are transferred to the RAM 5 (image memory) (Step S16) and the index images are displayed on the display 7 (Step S17).

Figure 7:
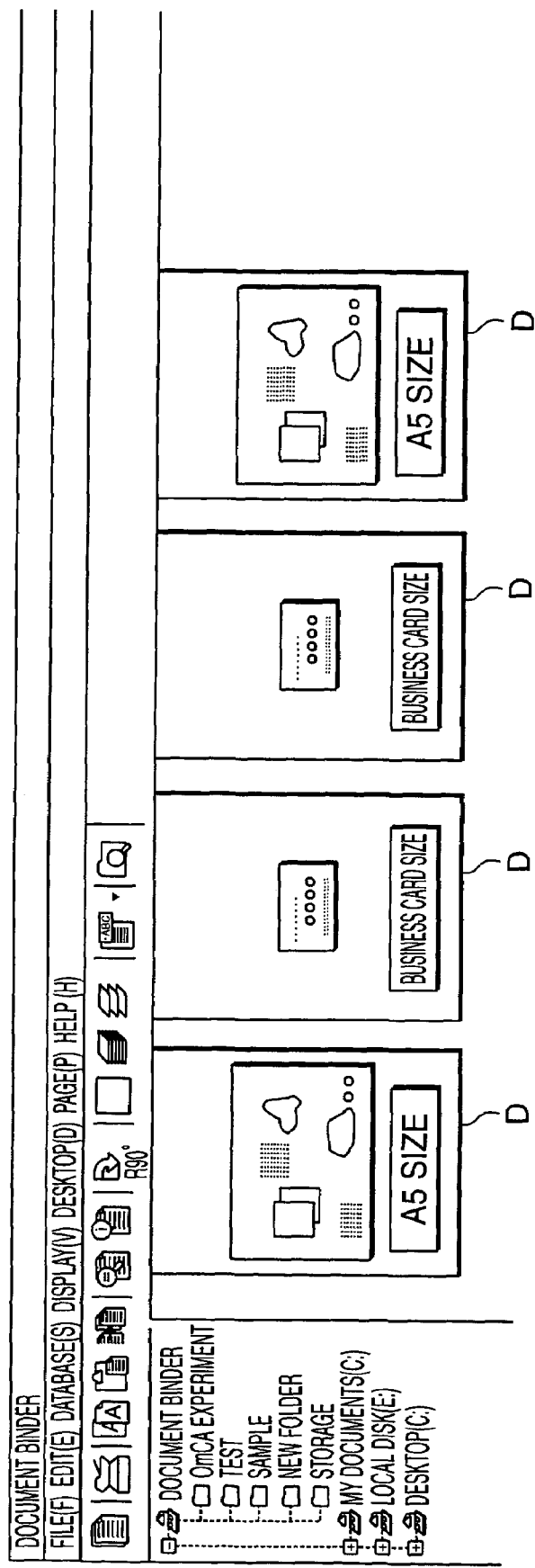
FIG. 7 is a diagram showing a display example of index images generated on the display by the second index image display processing.

For example, if only the image data of A5 size and business card size are stored in the storage medium 9 as shown in FIG. 7, the index image size of the image data of A5 size are so maximally enlarged that the index images are still accommodated within the index image display areas D. The index image size of the image data of business card size is so enlarged as to conform to the enlargement of the index image of the image data of A5 size, wherein the index images of these image data are smaller than those of the image data of A5 size while maintaining a relative dimensional relationship with the index images of the image data of A5 size.

Figure 8:
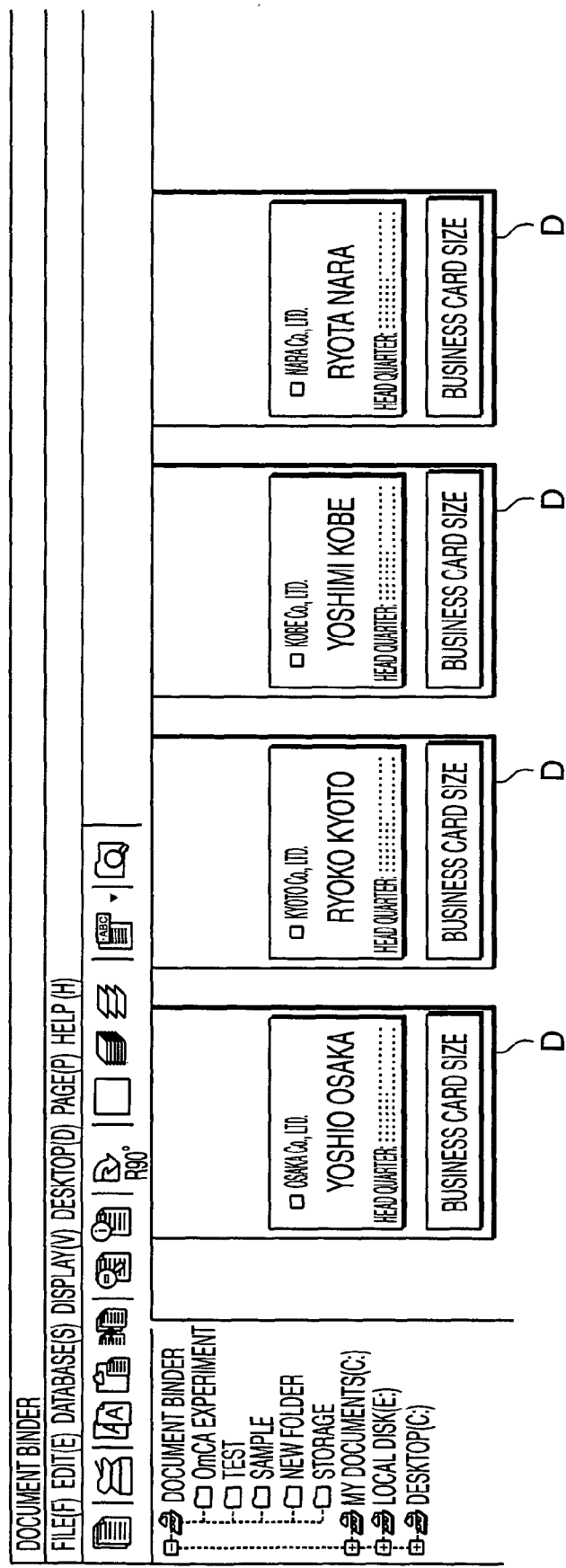
FIG. 8 is a diagram showing a display example of index images generated on the display by the second index image display processing.

Further, if the original image size of the image data stored in the storage medium 9 is only the business card size, i.e., only one small size as shown in FIG. 8, the index images of these image data of the business card size are determined to have a size maximally enlarged such that the index images are still accommodated within the index image display areas D.

Such enlarged index image sizes are preferably stored in the index image size storage within the image displaying program in correspondence with the combinations of the original image sizes of the image data stored in the storage medium 9.

In this way, unless the image data having the larger original image sizes are stored in the storage medium 9, the index image of the image data having the largest original image data among the stored image data may be generated while being so maximally enlarged as to be still accommodated within the index image display area D. Then, the contents of the index images are displayed large in the case of displaying the index images of only the image data having smaller original image sizes. Therefore, the user can easily understand the contents of the image data.

It should be appreciated that the image displaying apparatus 1 and the image displaying program are not limited to the constructions of the above embodiment and various changes can be made. For example, although the index image sizes of the image data are such as shown in FIG. 4 in the above embodiment, they are not limited thereto and can be suitably changed.

Next, a second image displaying apparatus and image displaying program product are described. No description is given on the schematic construction of the image displaying apparatus according to the second embodiment since it is similar to that of the previous image displaying apparatus.

Figure 9:
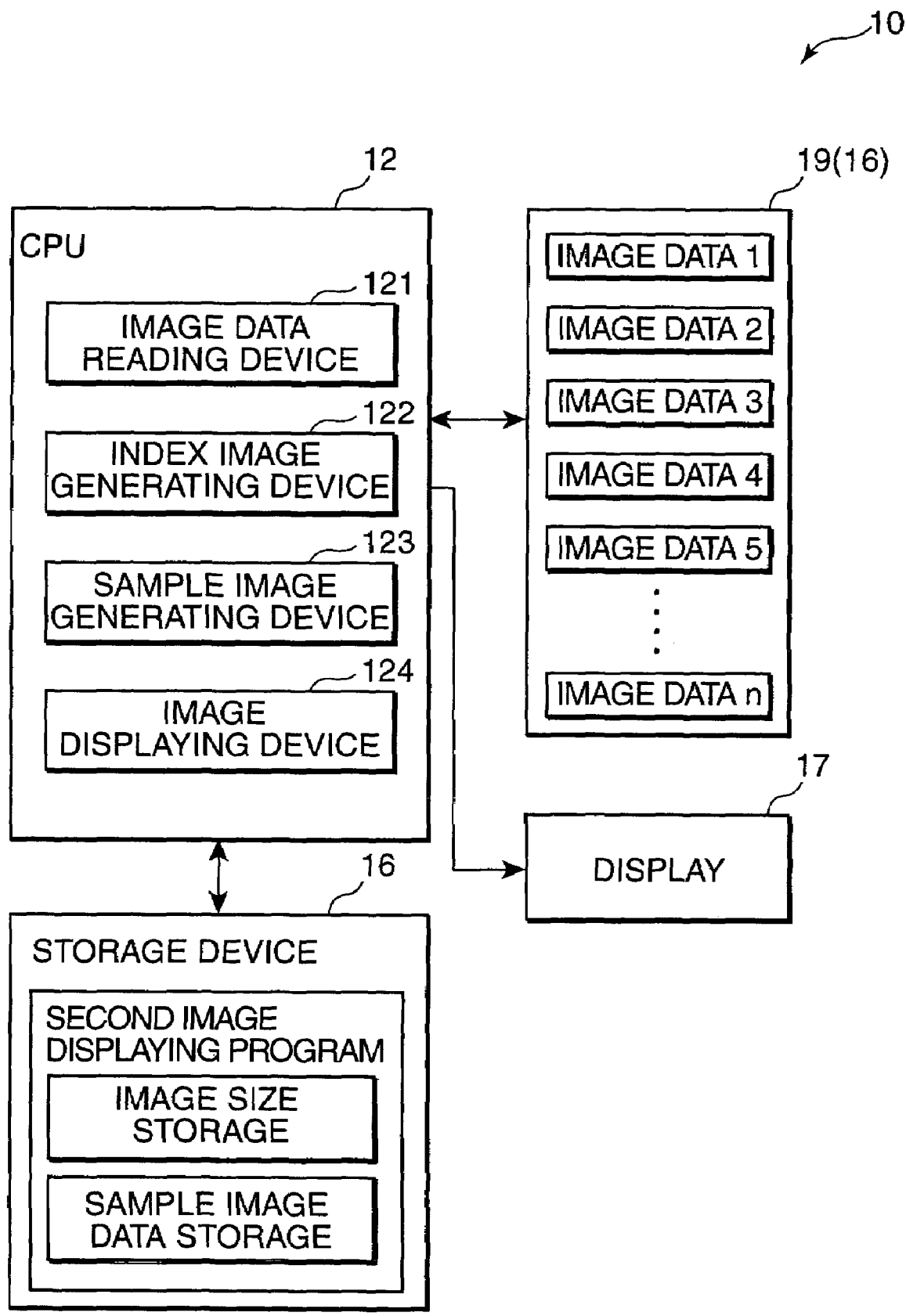
FIG. 9 is a block diagram showing main functions of an image displaying apparatus according to a second embodiment of the invention.
Figure 10:
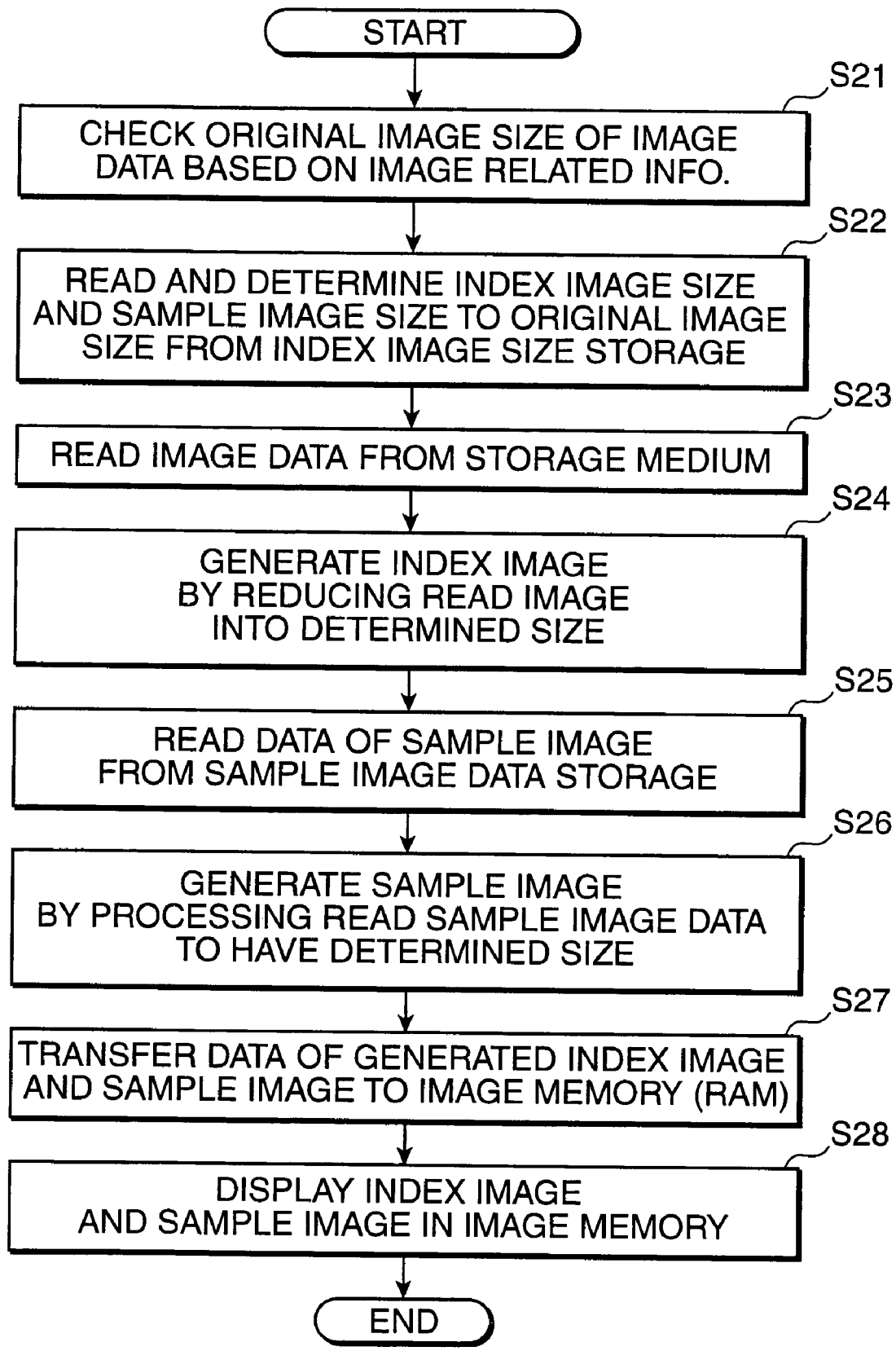
FIG. 10 is a flowchart showing a first image display processing of the second image displaying apparatus.

Main functions of the second image displaying apparatus 10 are described. Referring to FIG. 9 showing main functions of the image displaying apparatus 10, the image displaying apparatus 10 is similar to the aforementioned image displaying apparatus 1 in that the second image displaying programs is installed in a personal computer or the like to cause the personal computer to function as the image displaying apparatus 10 and that image data a to n read from a storage medium 19 are displayed on a display 17 as index images obtained by reducing the contents of the image data a to n into specified sizes.

The CPU 12 functions as an image data reading device or image data reader 121 for reading the image data stored in the storage medium 19 in accordance with a command given by the second image displaying program stored in a storage device 16; an index image generating device 122 for generating index images from the image data; a sample image generating device 123 for generating sample images (described in detail later) and an image displaying device 124 for displaying the generated index images and sample images on a screen of the display 17.

The image data reading device 121, the index image generating device 122 and the image displaying device 124 have the same functions and roles as the image data reading device 21, the index image generating device 22 and the image displaying device 24 of the image displaying apparatus 1.

The sample image generating device 123 reads sample image data from a sample image data storage within the second image displaying program, and generates sample images in the same sizes as the sample image sizes stored in an image size storage. The sample images are character images that are displayed near the index images when the index images are displayed in a list format and enable the original image sizes of the index images to be recognized through a dimensional comparison with the index images. It should be noted that the sample image generating device 123, the image size storage and the sample image data storage correspond to a sample image generator.

As the sample images, images of objects easy to specifically understand the size of the image data at the time of printouts such as images of human hand, cigarette's case, coin and the like are adopted. The sample image size is set such that a ratio of the size (size of a printing sheet) in the case of actually printing an index image (original image) out to the actual size of the human hand or the like is substantially equal to that of the index image size of the image data to that of the sample image size. In this embodiment, the sample image sizes corresponding to the original image sizes of the image data are stored in the image size storage.

Next, a first image display processing by the image displaying apparatus 10 is described. In the case of generating the index images using the image data stored in the storage medium 19, the CPU 12 first confirms the original image size of this image data in accordance with an image related information belonging to each image data stored in the storage medium 19 (Step S21), and reads the index image size and the sample image size corresponding to this original image size from the image size storage within the image displaying program and determines them (Step S22). This image display processing is similar to the one by the image displaying apparatus 1 in that, even if the original image size of the image data increases, the corresponding index image size is so set as not to increase perfectly in proportion.

After the index image size is determined, the image data is read from the storage medium 19 (Step S23) and the read image data is reduced by a compression processing to generate the index image of the determined size (Step S24). Further, the sample image data is read from the sample image storage within the image displaying program (Step S25), and a processing is applied to the read sample image data to generate the sample image of the determined size (Step S26). Subsequently, data of the generated index image and sample image are transferred to the RAM (image memory) (Step S27), and the index image is displayed on the display 17 (Step S28). The above processing is performed for all the image data stored in the storage medium 19.

Figure 11:
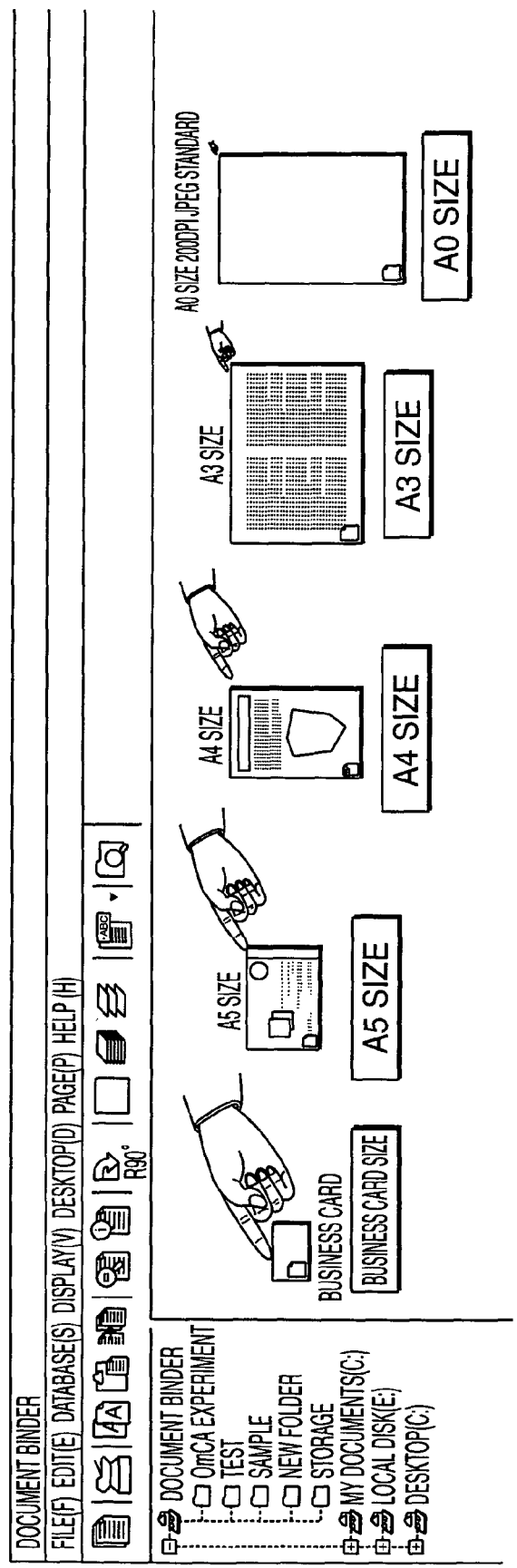
FIG. 11 is a diagram showing a display example of index images and sample images on the display according to the first image display processing of the second image displaying apparatus.
Figure 12:
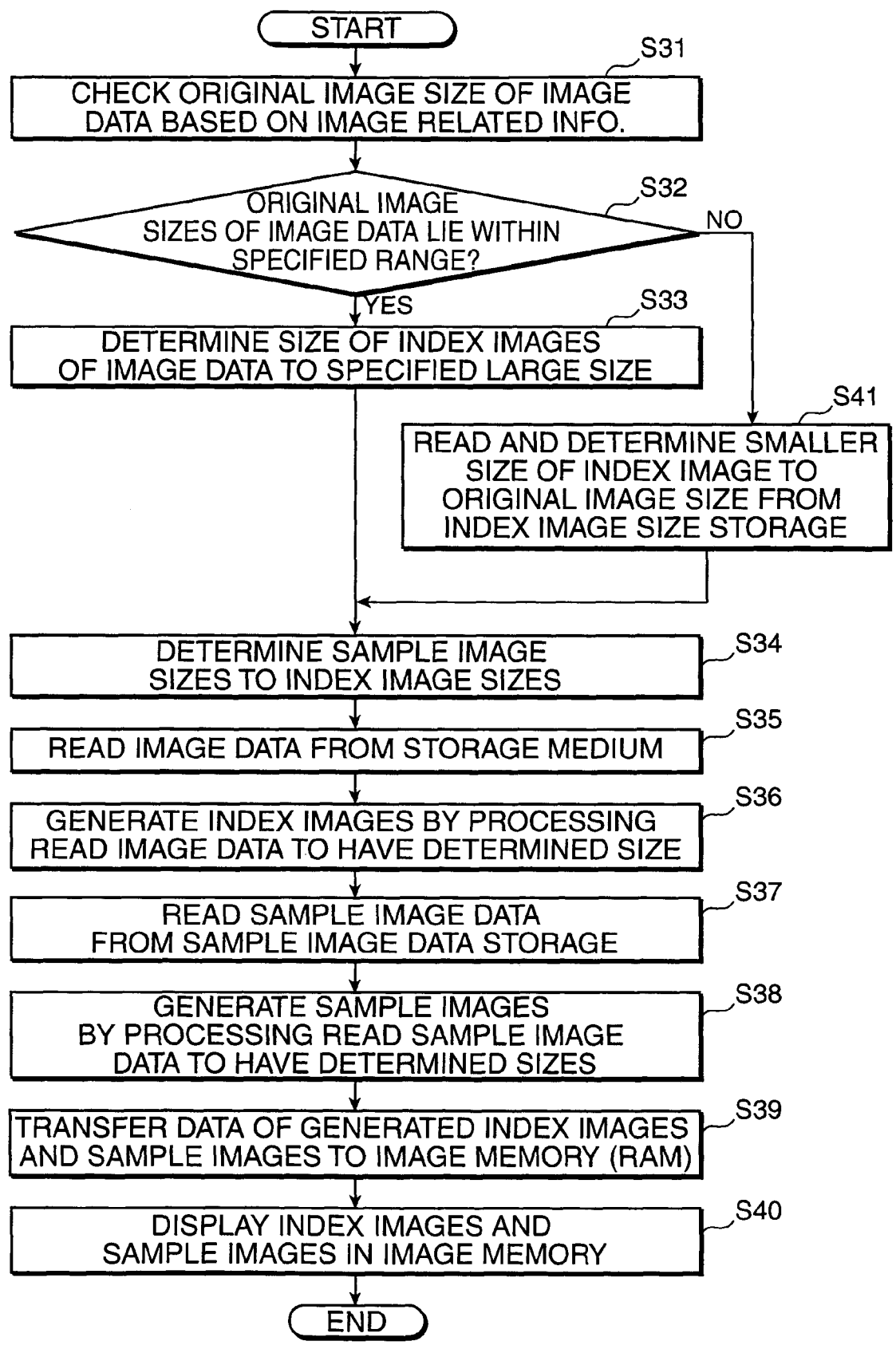
FIG. 12 is a flowchart showing a second image display processing of the second image displaying apparatus.

If the index images and the sample images are thus generated and displayed, the image of the human hand is displayed relatively larger in the case of the smaller original image size such as business card size while being displayed smaller in the case of the larger original image size such as A0 size as shown in FIG. 11. Thus, one can actually understand in which size the original images displayed as the index images are to be printed out through the comparison of the sizes of the index images and the sample images displayed in a list format.

Further, similar to the image displaying apparatus 1, there can be obtained an effect that the user can instantly select the image data of the necessary original image size by comparing the sizes of the respective index images displayed on the display 17 and an effect that the contents of the image data can be easily understand regardless of the original image sizes of the image data since all the contents of one page of the image data are displayed even if the original images have a large size such as A0 size and the contents of the image data are displayed large even if the original images have a small size such as business card size.

Next, a second image display processing by the image displaying apparatus 10 is described. In the second image display processing, if the original image sizes of a plurality of image data stored in the storage medium 19 are determined to lie within a specified range upon being compared (e.g., if the original image sizes of a plurality of image data are substantially same or if they do not largely vary from business card size to A0 size), the index images are generated while being enlarged to have such a maximum size as to be still accommodated within a section (index image display area D) allotted to display one index image while maintaining a relative dimensional relationship with the index images of the image data having other original image sizes. In conformity with the enlargement of the index images, the sample images are enlarged to maintain a relative dimensional relationship of the image sizes with the corresponding index images. It should be noted that the sample images may have such a size as to be displayed beyond the index image display areas D.

In the case of performing the second index image display processing, the CPU 12 first confirms the original image sizes of a plurality of image data stored in the storage medium 19 in accordance with an image related information belonging to the respective image data stored in the storage medium 19 (Step S31), and judges whether the original image sizes of the respective image data lie within the specified range (Step S32).

Here, if the original image sizes of the respective image data lie within the specified range (YES in Step S32), the sizes of the index images generated for the respective image data are determined to be a specified large size (Step S33). This specified large size is an index image size maximally enlarged to still accommodate the index image within the index image display area D while maintaining the relative dimensional relationship with the original image sizes of the respective image data. Such enlarged index image sizes are stored in the image size storage within the image displaying program in correspondence with combinations of the original image sizes of the image data for which the index images are to be generated.

Next, after the index image sizes are determined, the sample image sizes predetermined in correspondence with the index image sizes are determined (Step S34). In other words, the sample image sizes are determined such that the sample images are also enlargedly displayed by as much as the index images are enlargedly displayed.

Further, unless the original image sizes of the respective image data stored in the storage medium 19 lie within the specified range (NO in Step S32), e.g., if the original image sizes of the image data in the storage medium 19 largely vary from business card size to A0 size, similar to the first embodiment, standard sizes predetermined for the image data are read from the index image size storage regardless of the relative dimensional relationship of the original image sizes of the image data and determined as index image sizes (Step S41). In this case, the sample image sizes are determined to be standard sizes (size not for enlarged display) stored in the image size storage (Step S34).

After the index image sizes are determined, the respective image data are read from the storage medium 19 (Step S35) and a compression processing is applied to the read image data to generate the index images of the determined sizes (Step S36). Further, the sample image data are read from the sample image storage within the image displaying program (Step S37) and the read sample image data are processed to generate the sample images of the determined sizes (Step S38). Then, data of the generated index image data are transferred to the RAM (image memory) (Step S39) and the index images are displayed on the display 17 (Step S40).

Figure 13:
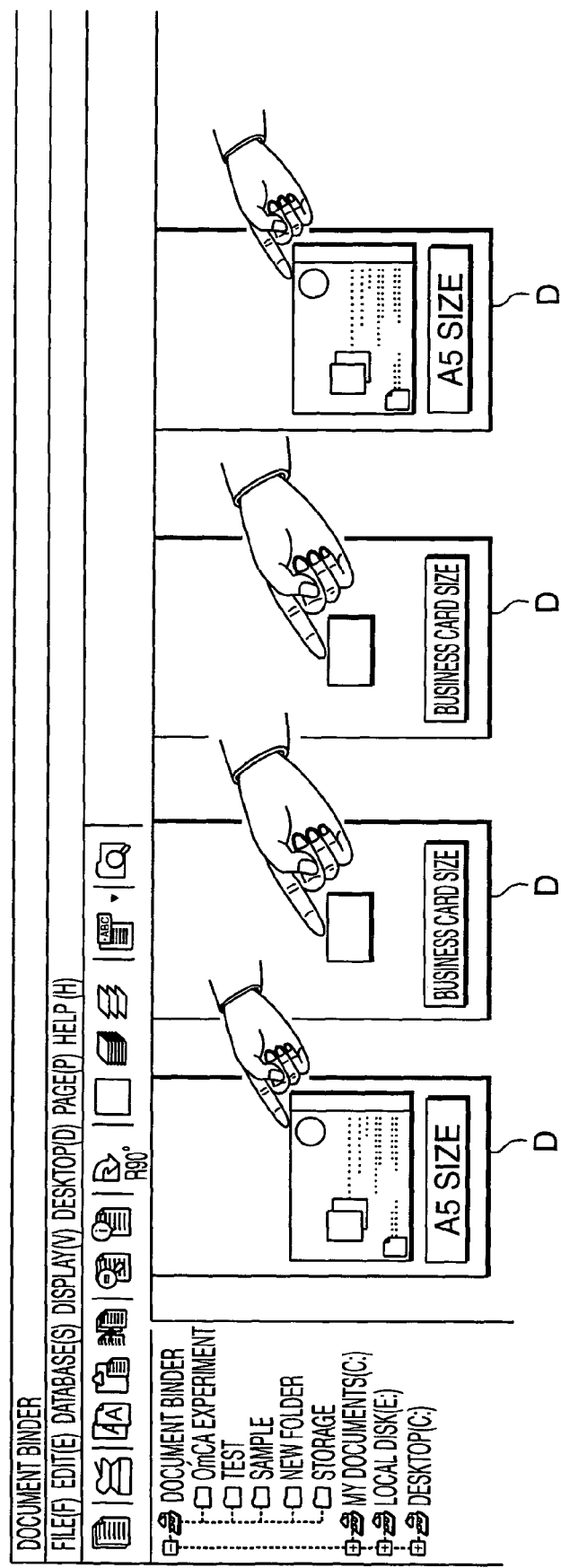
FIG. 13 is a diagram showing a display example of index images and sample images on the display according to the second image display processing.

For example, if only the image data of A5 size and business card size are stored in the storage medium 19, as shown in FIG. 13, the index image size of the image data of A5 size are so maximally enlarged that the index images are still accommodated within the index image display areas D. The index image size of the image data of business card size is so enlarged as to conform to the enlargement of the index image of the image data of A5 size, wherein the index images of these image data are smaller than those of the image data of A5 size while maintaining a relative dimensional relationship with the index images of the image data of A5 size.

Figure 14:
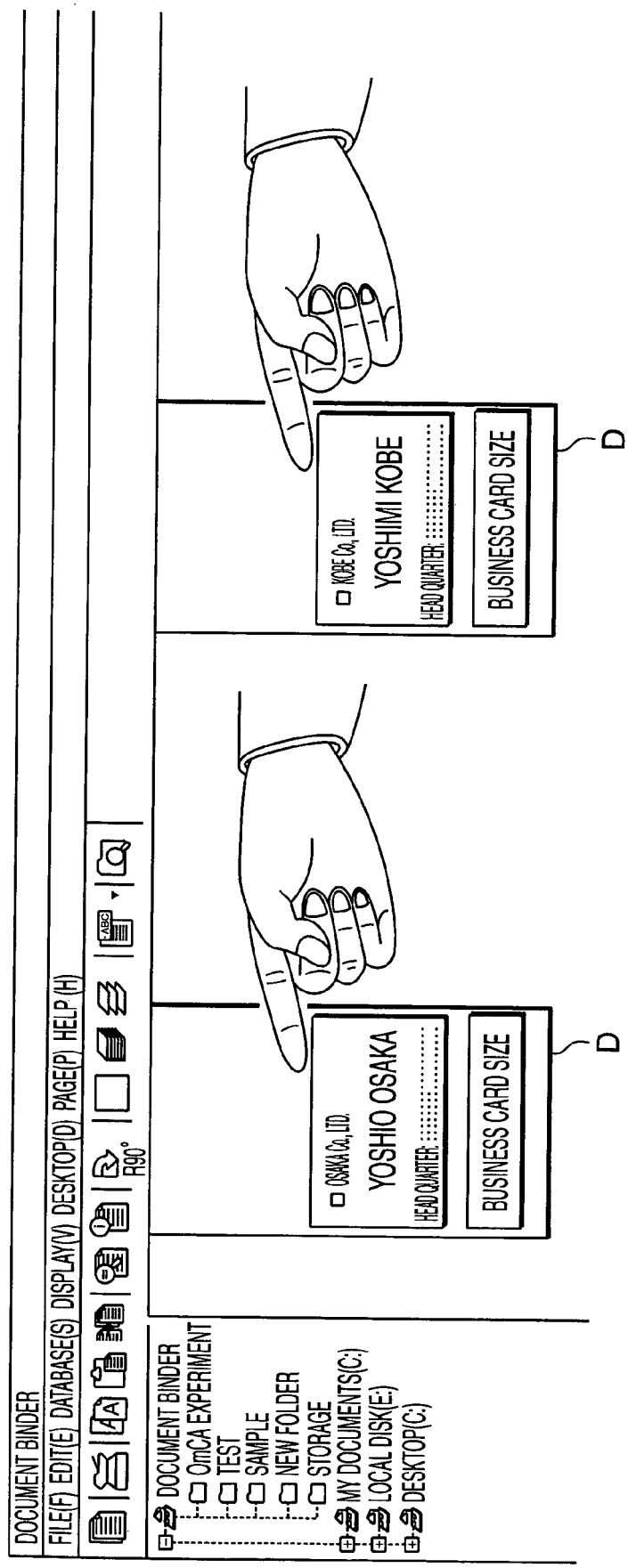
FIG. 14 is a diagram showing a display example of index images and sample images on the display according to the second image display processing.
Figure 15:
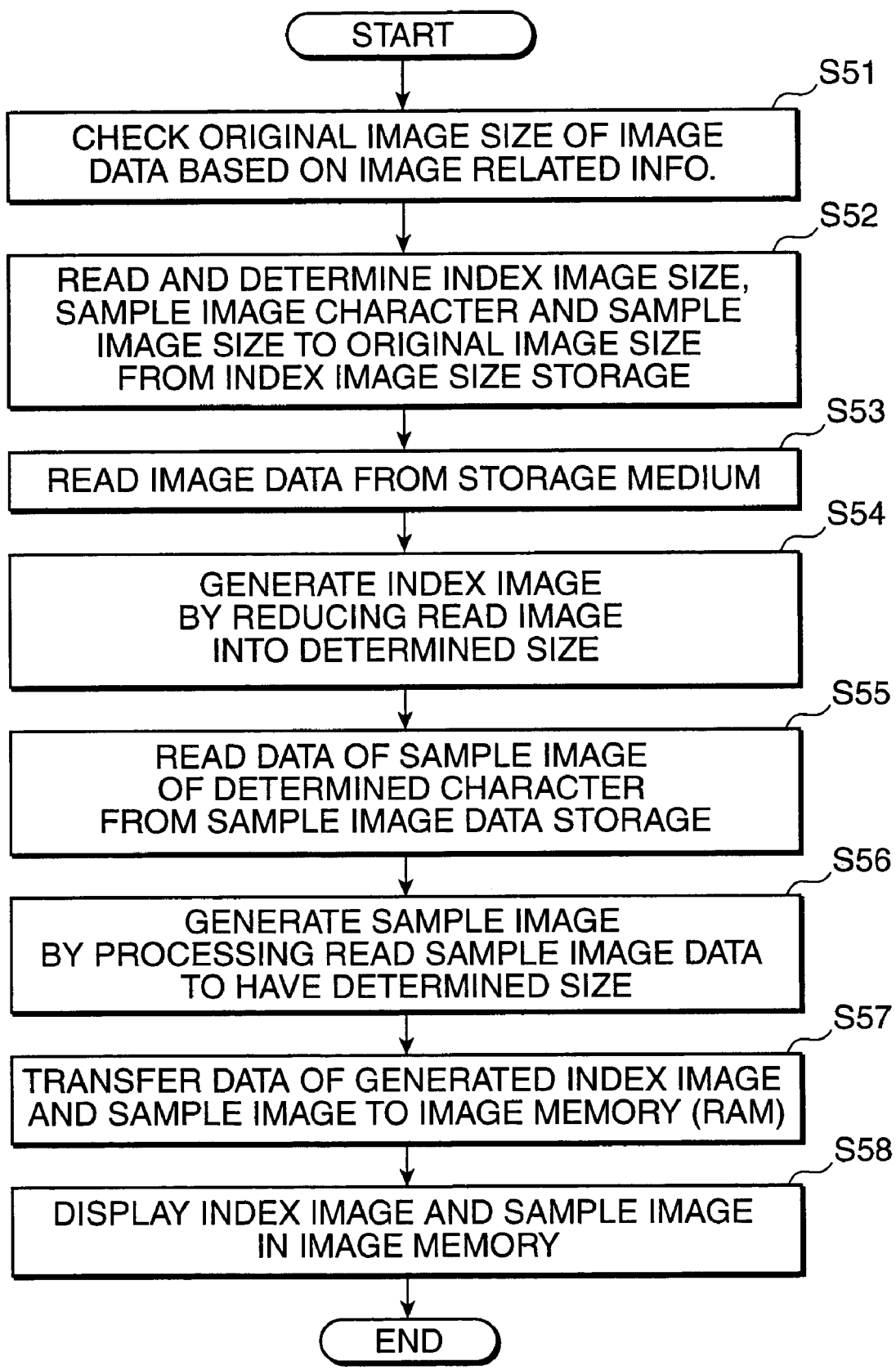
FIG. 15 is a flowchart showing a third image display processing of the second image displaying apparatus.

Further, if the original image size of the image data stored in the storage medium 19 is only the business card size, i.e., only one small size as shown in FIG. 14, the index images of these image data of the business card size are determined to have a size maximally enlarged such that the index images are still accommodated within the index image display areas D.

In this way, unless the image data having the large original image sizes are stored in the storage medium 19, the index image of the image data having the largest original image data among the stored image data may be generated while being maximally enlarged such that the index image is still accommodated within the index image display area D. Then, the contents of the index images are displayed large in the case of displaying the index images of only the image data having small original image sizes. Therefore, the user can easily understand the contents of the image data. Further, since the sample images are enlargedly displayed as the index images are enlargedly displayed, an effect of enabling the user to actually understand the specific size in the case of printing the index-displayed original images out can be kept.

Next, a third image display processing by the image displaying apparatus 10 is described. In the third image display processing, one can more clearly understand approximately in which size the index-displayed original images are to be actually printed out by changing the kind of the sample image based on the image size of the index image.

In the third image display processing, data of a plurality of character images (5-cent coin, human hand, object representing a human figure, etc.) are stored in the sample image data storage of the second image displaying program, and an information on which sample image character is used for which index image size (sample image character relating information) is stored in the image size storage.

First, the original image size of the image data is confirmed based on the image related information belonging to each image data stored in the storage medium 19 (Step S51) and, then, the index image size, the sample image character relating information (which character is to be used) corresponding to this original image size are read from the image size storage and the sample image size is determined (Step S52).

Then, this image data is read from the storage medium 19 (Step S53), and a compression processing or the like is applied to the read image data to generate the index image of the determined size (Step S54). Then, the sample image data of the determined character is read from the sample image storage within the image displaying program (Step S55), and the read sample image data is processed to generate the sample image of the determined size (Step S56). Data of the generated index image and sample image are transferred to the RAM (image memory) (Step S57), and the index image is displayed on the display 17 (Step S58).

Figure 16:
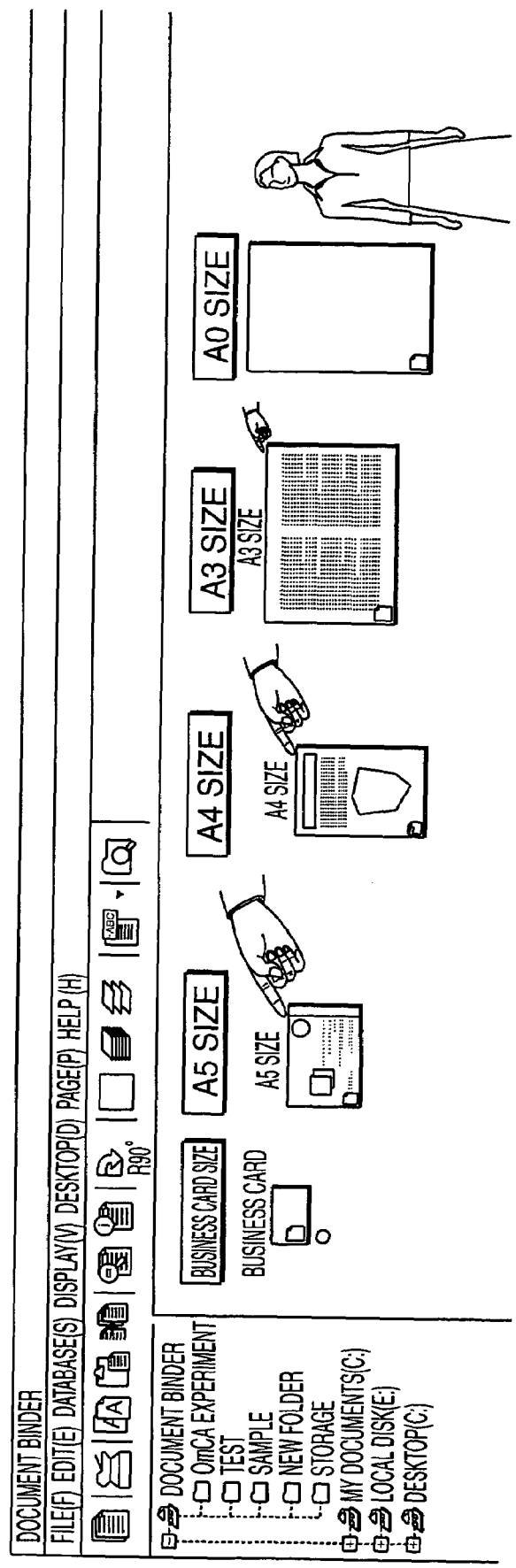
FIG. 16 is a diagram showing a display example of index images and sample images on the display according to the third image display processing of the second image displaying apparatus.
Figure 17:
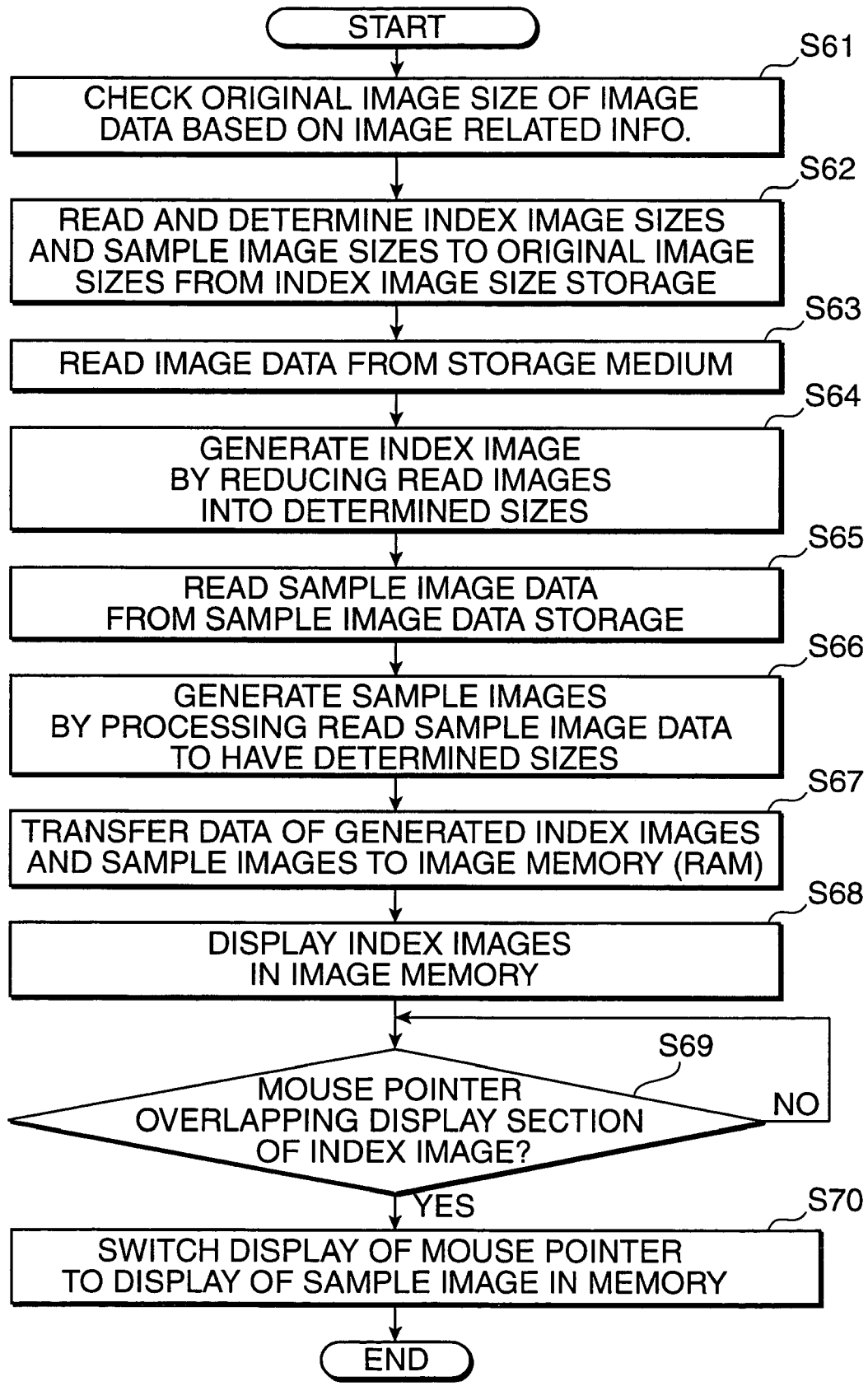
FIG. 17 is a flowchart showing a fourth image display processing of the second image displaying apparatus.
Figure 18:
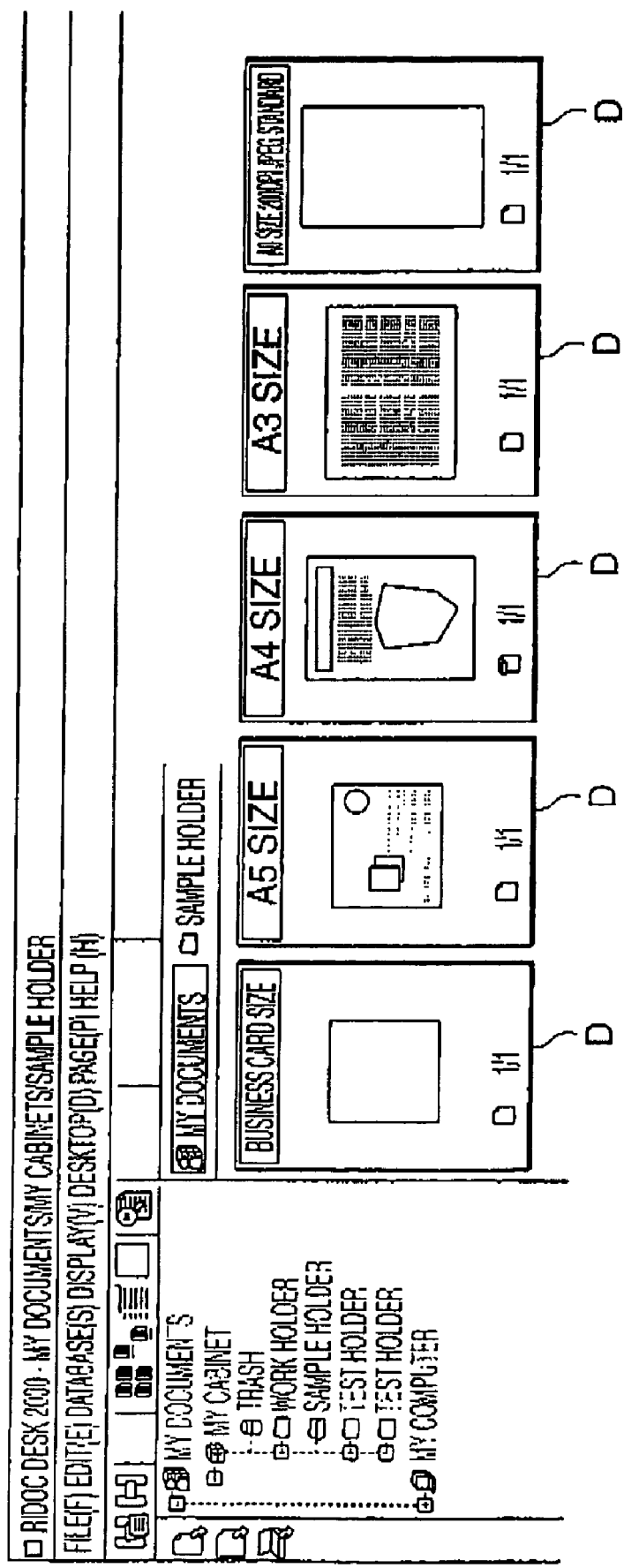
FIG. 18 is a diagram showing a display example of index images by a prior art image displaying apparatus.

For example, as shown in FIG. 16, an image of a 5-cent coin is set as the sample image character in the case of generating the index image for the image data having a small original image size such as business card size, and an image of a human figure is set as the sample image character in the case of generating the index image for the image data having a large original image size such as A0 size. In this way, the specific size of the displayed image when being printed out can be actually better understood as compared to the case where only the sample images of the human hand are displayed as the sample images. Further, an image of a human hand is set as the sample image character for the index image having a frequently used business sheet size such as A3 to A5 sizes as the original image size. The specific size of the image data can be actually understood by changing the size of the sample image of this human hand according to the image size.

In the third image display processing as well, in the case that the original image sizes of a plurality of image data stored in the storage medium 19 are compared and judged to lie within a specified range as in the second image display processing, the index image may be so maximally enlarged as to be still accommodated in the index image display area while maintaining a relative dimensional relationship with the index images of the image data having other original image sizes, and the sample image may be enlargedly generated in conformity with the above enlarged image generation to maintain a relative dimensional relationship of the images size with the corresponding index image.

Next, a fourth image display processing by the image displaying apparatus 10 is described. In the fourth processing, no sample image is displayed when the index images are displayed on the screen of the display 17. Under a condition that a mouse pointer (icon for, e.g., the designation of a range to be so displayed as to move on the screen as a pointing device such as a mouse is operated) displayed on the screen of the display 17 overlaps an index image display section, the mouse pointer is switched to the sample image to be displayed (the sample image may be displayed adjacent to the index image under a condition that the mouse pointer overlaps the index image display section).

Similar to the first processing, the index images and the sample images are generated for the image data stored in the storage medium 19, and transferred to the image memory (RAM) to be temporarily saved therein (Steps S61 to S67). Out of the index images and the sample images saved in the image memory (RAM), only the index images are displayed on the display 17 (Step S68). When the mouse pointer displayed on the screen together with the index images overlaps any one of the display sections of the index images (YES in Step S69), the sample image corresponding to the index image overlapped with the mouse pointer is displayed on the display 17 (Step S70).

In the fourth image display processing, there is normally a simple screen where only the index images are displayed, whereby the sizes of the index images and the contents of the images are easy to see. When the user wishes to actually understand the sizes of the images when the images are actually printed out through the comparison of the image sizes of the index images and the sample images, the sample image is immediately displayed if the mouse pointer is placed to overlap the desired index image.

In the fourth image display processing as well, the index images and the sample images may be enlarged as in the second image display processing, or the kind of the sample image may be changed according to the image size of the index image as in the third image display processing.

It should be noted that the image displaying apparatus 10 and the image displaying program are not limited to the constructions of the above embodiments and various changes can be made. For example, although the index image sizes of the image data are such as shown in FIG. 4 in the above embodiments, they are not limited there to and can be suitably changed. Further, although the images of the 5-cent coin, human hand, human figure and the like are prepared as the sample image characters in the above embodiments, other character images may be used.

In general, the routines executed to implement the embodiment of the invention, whether implemented as part of an operating system or a specific application, component, program, object, module or sequence of instructions will be referred to as "programs". The program comprises one or more instructions that are resident at various times in various memory and storage devices in a computer, and that cause the computer to perform the steps necessary to execute steps or elements embodying the various aspects of the invention.

The embodiment of the invention has and will be described in the context of functioning the computer and computer system. However, those skilled in the art will appreciate that various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

As described above, an inventive image displaying apparatus comprises: an image data reader for reading image data stored in a storage medium; an index image size storage for storing index image sizes predetermined in correspondence with original image sizes of the image data; an index image generator for generating index images of index image sizes corresponding to the original image sizes using the read image data; and an index image displaying device for displaying the generated index images on a monitor screen. The index image sizes corresponding to the original image sizes larger than a standard size are stored with larger rates of reduction to the original image sizes in the index image size storage, so that at least one page of the index image is entirely displayed while maintaining a relative dimensional relationship with the index image sizes corresponding to the other original image sizes.

The index image sizes corresponding to the original image sizes smaller than the standard size may be preferably so stored in the index image size storage as to have smaller rates of reduction to the original image sizes while maintaining a relative dimensional relationship with the index image sizes corresponding to the other original image sizes.

The index image sizes stored in the index image size storage may be preferably set to have such maximum sizes that the index images corresponding to the respective original image sizes are accommodated in index image display areas while maintaining a relative dimensional relationship of the index images corresponding to the respective original image sizes in the case that the original image sizes of a plurality of image data stored in the storage medium lie within a specified range.

Another inventive displaying apparatus for generating index images of image data stored in a storage medium and displaying the generated index images on a display or the like, comprises: an image data reader for reading image data stored in the storage medium; an index image generator for generating index images of image sizes corresponding to the original image sizes of the image data using the read image data; a sample image generator for generating sample images to cause a user to recognize the original image sizes of the image data of the index images through a comparison with the index images; and an image displaying device for displaying the index images and the sample images on a screen of the display.

The sample image generator may be preferably made to generate the sample images by changing the kind of the sample images based on the image sizes of the index images.

The image displaying means may be preferably to switch the display of a mouse pointer to the sample image under a condition that the mouse pointer displayed on the screen of the display overlaps the index image when the index images are displayed on the screen of the display.

An inventive image displaying program product comprises a program and a signal bearing medium bearing the program. The program causes a computer to perform the following functions: an image data reading means for reading image data stored in a storage medium; an index image size storage for storing index image sizes predetermined in correspondence with original image sizes of the image data; an index image generating means for generating index images of index image sizes corresponding to the original image sizes using the read image data; and an index image displaying means for displaying the generated index images on a monitor screen. The index image sizes corresponding to the original image sizes larger than a standard size are stored with larger rates of reduction to the original image sizes in the index image size storage, so that at least one page of the index image is entirely displayed while maintaining a relative dimensional relationship with the index image sizes corresponding to the other original image sizes.

Another program product for generating index images of image data stored in a storage medium and displaying the generated index images on a display or the like, comprises a program and a signal bearing medium bearing the program. The program causes a computer to function as: an image data reading means for reading the image data stored in the storage medium; an index image generating means for generating index images of image sizes corresponding to the original image sizes of the image data using the read image data; a sample image generating means for generating sample images to cause a user to recognize the original image sizes of the image data of the index images through a comparison with the index images; and an image displaying means for displaying the index images and the sample images on a screen of the display.

With such constructions, the index image is generated with the larger rate of reduction to the original image size while maintaining the relative dimensional relationship with the index images of the image data having the other original image sizes in the case that the original image size of the image data read from the storage medium is larger than the standard size.

Thus, the original image sizes of the respective images can be instantly understood through a comparison of the sizes of the respective index images when a plurality of index images generated are displayed in a list format, and the image of a necessary size can be easily found out.

Further, since at least one page of the index image can be entirely displayed, a user can easily understand the contents of the index image or original image.

Also, a sample image is displayed with an index image on the display. Accordingly, a specific size of a displayed index image when being printed out can be actually better understood by seeing the index image and the sample image.

This application is based on patent application Ser. Nos. 2002-163477 and 2002-163478 filed in Japan, the contents of which are hereby incorporated by references.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image displaying apparatus, comprising:
an image data reader which reads image data stored in a storage medium;
an index image size storage which stores index image sizes predetermined in correspondence with original image sizes of the image data;
an index image generator which generates index images of index image sizes corresponding to the original image sizes using the and image data; and
an index image displaying device which displays the generated index images on a monitor screen,
wherein the index image sizes corresponding to the original image sizes larger than a standard size are stored with larger rates of reduction to the original image sizes in the index image size storage, so that at least one page of the index image is entirely displayed while maintaining a relative dimensional relationship with the index image sizes corresponding to the other original image sizes.

2. An image displaying apparatus according to claim 1, wherein the index image sizes corresponding to the original image sizes smaller than the standard size are so stored in the index image size storage as to have smaller rates of reduction to the original image sizes while maintaining a relative dimensional relationship with the index image sizes corresponding to the other original image sizes.

3. An image displaying apparatus according to claim 2, wherein the index image sizes stored in the index image size storage are set to have such maximum sizes that the index images corresponding to the respective original image sizes are accommodated in index image display areas while maintaining a relative dimensional relationship of the index images corresponding to the respective original image sizes in the case that the original image sizes of a plurality of image data stored in the storage lie within a specified range.

4. An image displaying apparatus according to claim 1, wherein the index image sizes stored in the index image size storage are set to have such maximum sizes that the index images corresponding to the respective original image sizes are accommodated in index image display areas while maintaining a relative dimensional relationship of the index images corresponding to the respective original image sizes in the case that the original image sizes of a plurality of image data stored in the storage lie within a specified range.

5. A computer readable medium including an executable program product for configuring a computer for displaying an image on a monitor screen, the executable program product configuring the computer to function as a device comprising:
an image data reading means for reading image data stored in a storage medium;
an index image size storage for storing index image sizes predetermined in correspondence with original image sizes of the image data;
an index image generating means for generating index images of index image sizes corresponding to the original image sizes using the read image data; and
an index image displaying means for displaying the generated index images on a monitor screen; and
wherein the index image sizes corresponding to the original image sizes larger than a standard size are stored with larger rates of reduction to the original image sizes in the index image size storage, so that at least one page of the index image is entirely displayed while maintaining a relative dimensional relationship with the index image sizes corresponding to the other original image sizes.

6. The executable program product according to claim 5, wherein the index image sizes corresponding to the original image sizes smaller than the standard size are so stored in the index image size storage as to have smaller rates of reduction to the original image sizes while maintaining a relative dimensional relationship with the index image sizes corresponding to the other original image sizes.

7. The executable program product according to claim 6, wherein the index image sizes stored in the index image size storage are set to have such maximum sizes that the index images corresponding to the respective original image sizes arc accommodated in index image display areas while maintaining a relative dimensional relationship of the index images corresponding to the respective original image sizes in the ease that the original image sizes of a plurality of image data stored in the storage means lie within a specified range.

8. The executable program product according to claim 5, wherein the index image sizes stored in the index image size storage are set to have such maximum sizes that the index images corresponding to the respective original image sizes are accommodated in index image display areas while maintaining a relative dimensional relationship of the index images corresponding to the respective original image sizes in the case that the original image sizes of a plurality of image data stored in the storage means lie within a specified range.

* * * * *